United States Patent [19]

Segre-Amar

[11] Patent Number: 4,510,349

[45] Date of Patent: Apr. 9, 1985

[54] SYSTEM AND METHOD FOR TRANSMITTING MESSAGES TO A TELEPHONE SET THROUGH THE SUBSCRIBER'S LINE IN A TELEPHONE SYSTEM

[76] Inventor: Leonello Segre-Amar, 26, avenue de la Grande-Bretagne, Monte-Carlo, Monaco

[21] Appl. No.: 520,246

[22] Filed: Aug. 4, 1983

Related U.S. Application Data

[63] Continuation-in-part of Ser. No. 452,072, Dec. 22, 1982, abandoned.

[30] Foreign Application Priority Data

Dec. 30, 1981 [FR] France .................................. 81 24542
Nov. 17, 1982 [FR] France .................................. 82 19239
Jun. 29, 1983 [FR] France .................................. 83 10782

[51] Int. Cl.³ ........................................... H04M 11/00
[52] U.S. Cl. .................... 179/2 A; 179/2 R; 179/18 B; 179/6.01
[58] Field of Search .................... 179/2 R, 2 A, 2 DP, 179/5.5, 2 AM, 6.17, 18 BF, 18 BG, 81 R, 84 C, 89, 99 P, 6.01, 18 B

[56] References Cited

U.S. PATENT DOCUMENTS

| 3,727,003 | 4/1973 | Paraskevakos | 179/5.5 X |
| 3,974,338 | 8/1976 | Luzier et al. | 179/6.17 X |
| 4,166,929 | 9/1979 | Sheinbein | 179/18 BG |
| 4,242,539 | 12/1980 | Hashimoto | 179/5.5 |
| 4,311,875 | 1/1982 | Danner | 179/2 A |

OTHER PUBLICATIONS

*The Bell System Technical Journal*, vol. 60, No. 6, Jul.-Aug., 1981, pp. 1083–1108, Anderson et al, "Mass Announcement Subsystem".
*IBM Technical Disclosure Bulletin*, vol. 22, No. 6, Nov. 1979, Abramson, "Touch-Tone Spurious Triggering Prevention".

*Primary Examiner*—Gene Z. Rubinson
*Assistant Examiner*—W. J. Brady
*Attorney, Agent, or Firm*—Steinberg & Raskin

[57] ABSTRACT

A message transmitting system incorporated in a telephone system includes a device for generating service signals relating to the making of a telephone connection between one telephone set and another telephone set and a mixer with two inputs which are connected to the service signal generating device and to a message generating device, respectively. The output of the mixer being connected to the telephone line.

30 Claims, 6 Drawing Figures

SYSTEM AND METHOD FOR TRANSMITTING MESSAGES TO A TELEPHONE SET THROUGH THE SUBSCRIBER'S LINE IN A TELEPHONE SYSTEM

This is a continuation-in-part of application Ser. No. 452,072, filed Dec. 22, 1982, now abandoned for a system for transmitting messages to a telephone set through the subscriber's line in a telephone system.

The present invention relates to a system for transmitting messages to a telephone set through the telephone line associated therewith in a telephone system or plant comprising a device for generating service signals relating to the making of a telephonic connection or communication between this set and another telephone set.

These service signals such for instance as operating signals, free line or dial tone or ringing tone signals, back-calling signals, routing or bush signals are sent to any user of a telephone set who has unhooked or lifted the handset and wishes to send a call to another telephone set or is doing it. This telephone line requesting user should take such service signals into consideration because they advise him about the state of the telephone network or system determining the progress of the calling procedure and indicating whether his call has or has not succeeded. This means that the user is listening during substantially the whole period of establishing the communication except for the dialling or keyboard operation times.

The object of the present invention is to provide a system for transmitting during the periods of presence of such service signals or at least of some of such signals, messages, for instance sounding messages such as advertising texts or of any other character or music.

To achieve such a goal the message transmitting system according to the invention comprises a mixer with two inputs which are connected to the service signal generating device and to a message generating device, respectively, the output of the mixer being connected to the telephone line.

According to an advantageous characterizing feature of the invention the system comprises a service signal and message emission synchronizer.

According to another advantageous characterizing feature of the invention the mixer consists of a transformer with two primary windings and one secondary winding and the free terminals of the windings are constituting the inputs of the mixer, the common terminal of the windings being grounded or earthed.

Still another object of the present invention is to provide a system for transmitting messages to a telephone set completed with a display or viewing screen and, if need be, further message receiving means such as a printing device. This telephone set having thus rather become a subscriber terminal is therefore adapted to be connected to a telematic network designed for data transmission. This terminal for instance could be connected to a videophonic network or to a data-bank consulting network.

For accomplishing such an object, the message transmission system according to the present invention is characterized in that the message generator consists of a signal such as data signal emitting device adapted to be reproduced in the telephone set of the subscriber calling for or requesting the making of the telephone connection onto a support such as a viewing and/or printing screen, this emitting device being connected to the input of a mixer another input of which receives the service signals and the output of this mixer being adapted to be connected to the calling subscriber line.

According to an advantageous characterizing feature of the present invention the transmission system comprises a separator for separating the service signals from the signals to be reproduced onto a support, within the subscriber's telephone set or station.

According to still another advantageous characterizing feature, the transmission system comprises a service signal presence detector and, if need be, a detector for sensing the moment of the response of the called subscriber's set or station, both detectors being connected to a control circuit for putting the message generator on and off, respectively.

According to still a further advantageous characterizing feature of the invention, the subscriber's set or station is fitted with a storage device or memory for storing the information received from the message generator during the time period of making the connection with the called subscriber's set or station and for reproducing such information at any desired suitable time onto the support such as the viewing screen.

Still another object of the present invention is to provide a system for automatically transmitting messages to a telephone set.

For accomplishing such an object, the message transmission system according to the invention is characterized in that the message generating device comprises several positions, namely a master portion constituting a control and recording unit and at least one slave portion constituting a unit for execution and transmission of the messages to the telephone line.

According to an advantageous feature of the invention the message generating device comprises computer or microprocessor or like means, program storage means and a device for recording and reproducing the messages in accordance with the said program.

According to another advantageous feature of the invention, the recording and reproducing device comprises a recording means such as disc capable of carrying a plurality of messages advantageously recorded in digital form.

The present invention has also for object a method of message transmission to a telephone set or station by means of the hereabove system and characterized in that the computer or microprocessor means are programmed and the messages to be transmitted are compiled, reproduced or modified in accordance with the said program.

For a fuller understanding of the invention, reference is made to the following description, taken in connection with the accompanying drawings, in which.

Figure 1:
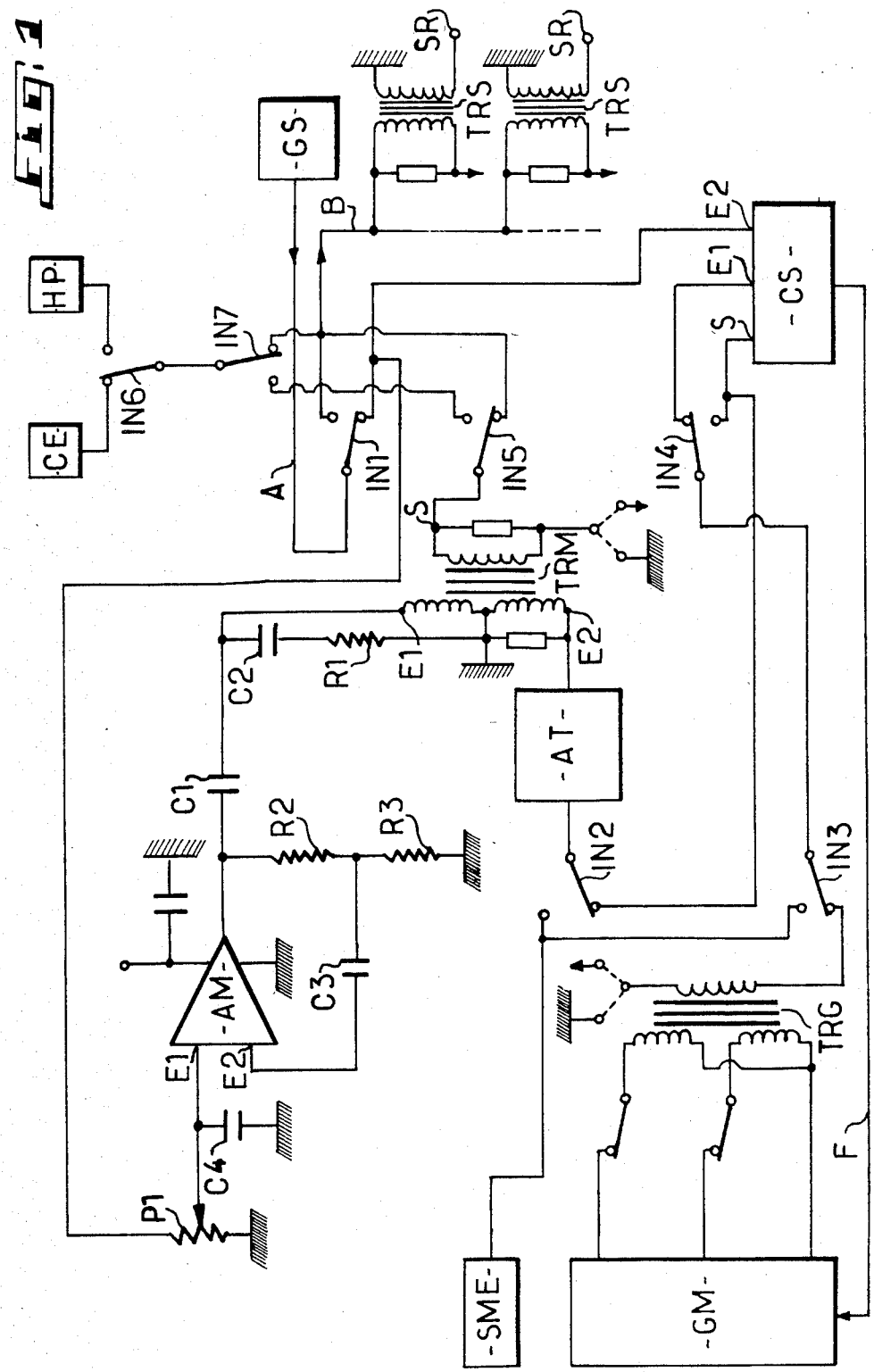
FIG. 1 shows as a block diagram the principle of the message transmitting system according to the present invention.

As shown in FIG. 1, a telephone plant or arrangement to which the present invention is applicable comprises a device for generating special electric currents GS adapted for the emission of a number of service signals such as operating signals, back-call signals, routing signals, busy signals, calling signals and so on. These signals are sent to every subscriber's set or station the handset of which has been withdrawn with a view of providing from this set or station a telephone connection with another subscriber's set or station. According to FIG. 1, the service signals are conveyed to the communication calling telephone set successively through telephone line sections A and B and a telephone network section SR. Each one of the different sections SR (only two of which are shown by way of example) is connected to the line section B by a transformer TRS.

As appearing from FIG. 1, the direct connection between the telephone line section A and B may be broken off by means of a change-over switch IN1 for connecting the message transmitting system according to the present invention between both line sections.

This system comprises a mixer TRM with two inputs E1, E2 and an output S. In the example shown, the mixer consists of a transformer with two primary windings which are mounted in series and the common point of which is grounded or earthed. The free terminal of each primary winding forms one of the two inputs E1,E2 of the mixer. The input E1 is connected to the output of a differential amplifier device AM the control or drive input of which is connected to the input line section A through the agency of the switch IN1. The input E2 of the transformer-mixer TRM is likely to be connected to a message for instance a sounding message generating device through the medium of an attenuator AT, a changeover switch IN2, a synchronizing circuit CS, a changeover switch IN3 and a suitable transformer TRG. A changeover switch IN4 makes it possible to withdraw the synchronizer CS from the circuit interconnecting the mixer TRM and the message generator GM. The input and the output, for the messages to be transmitted, of the synchronizing circuit CS are designated by the reference characters E1 and S. The synchronizing circuit CS comprises a second input E2 at which it receives the service signals from the line section A. The arrangement of the synchronizing circuit CS will be described in detail hereinafter.

As to the arrangement of the amplifier AM, it is seen that its control input is connected to the contact slide of a potentiometer P1 connected with one terminal to the line section A. The other terminal is grounded or earthed. The output of the amplifier AM1 is connected through a capacitor C1 to the input E1 of the transformer-mixer TRM. A series-connected circuit consisting of a capacitor C2 and a resistor R1 is interposed between this input and the ground or earth. The output of the amplifier AM is, moreover, connected through two series-connected resistors R2,R3 to the ground or earth. The second input E2 of the amplifier is connected through a capacitor C3 to the common point of both resistors R2,R3. It is further seen that a capacitor C4 is connected across the input E1 of the amplifier AM and the ground.

It should be pointed out that the message-generating device GM could comprise one or several (for instance two, as in FIG. 1) cassette or record pick-up or reading devices and emergency generators or devices of any other kind. It is advantageous that a generator which operates in principle continuously without a stop be a record generator, whereas a cassette generator is more suitable for the transmission of specific messages because it offers the advantage of a quick cassette changing. In addition to the message-generator GM, the system according to the invention could comprise an outer modulation source SME for the transmission of particular and occasional messages. This source could be connected to the mixer TRM instead of the generating device GM either directly through the switch IN2 or through the medium of the synchronizing circuit by putting the switch IN3 in its position not shown.

The arrangement of the synchronizing circuit CS will be described hereinafter with reference to FIG. 2.

The synchronizing circuit comprises two parts, namely a first part I for the on/off control of the message-generating device GM and a second part II adapted to make or to cut off the connection between the generating device GM and the mixer TRM. The action of the part I upon the generating device GM is substantially shown on FIG. 1 by the arrowed line F.

The part I is connected to the service signal receiving input E2. It comprises a flip-flop BA1 consisting of two NOR gates P1,P2 having each one two inputs. As known per se the output of one gate is connected to the input of the other gate. The free input of each gate forms one input of the flip-flop. The free input of the gate P1 is connected to the input E2 of the synchronizing circuit CS which is adapted to receive the service signals, through the agency of a circuit which essentially comprises an input transformer TRC, a low-pass filter PB, a Schmitt trigger circuit BS1, an inverter IV1 and a differential circuit CD1. The latter comprises a capacitor C6 connected between the inverter IV1 and the input of the gate P1 and a parallel connection of a resistor R5 and of a diode D1, which connects this input to the ground. It is the anode of the diode which is grounded. As a Schmitt trigger circuit is used a series connection of two inverters IV2,IV3 consisting each one of a NOT-AND or NAND gate the inputs of which are connected together. A resistor R6 is mounted in parallel relation to the inverters. The low-pass filter PB comprises a capacitor mounted in parallel relation to the secondary winding of the transformer TRC and a series connection of a variable resistor R7 and a resistor R8 connected across the secondary winding of the transformer and the Schmitt trigger circuit BS1. The common point of both resistors R8 and R7 is connected to the cathode of a diode D2 the anode of which is grounded. This common point is, moreover, connected to the stationary contact piece of a switch button B1. The movable contact of the latter is connected to a positive voltage potential through a resistor R9. At rest, the switch is in its open position.

The output of the gate P1, which forms an output of the flip-flop BA1, is connected through the agency of a resistor R10 to the base of switching transistor T1. In the emitter circuit of this transistor are series-connected a resistor R11 and a light-emitting diode DE1. This diode is emitting a light for instance of red colour. The emitter of the transistor T1 forms an output of the control circuit for the message-generating device GM.

The free input of the gate P2, which forms the second input of the flip-flop BA1, is connected to a voltage divider consisting of a resistor R12 connected to a positive potential and a variable resistor R13 which is grounded, through the medium of a resistor R14, of a Schmitt trigger circuit BS2 and of a differential circuit CD2. The Schmitt trigger circuit BS2 and the differential circuit CD2 have the same constructions as the Schmitt trigger circuit BS1 and the differential circuit CD1, respectively. The inverters IV4, IV5 and the resistor R15 correspond to the inverters IV2 and IV3 and to the resistor R6, respectively. The differential circuit CD2 accordingly comprises a capacitor C8, a resistor R17 and a diode D4 which correspond to the capacitor C6, the resistor R5 and the diode D1, respectively.

As to the voltage divider, it is seen that a resistor R16 may be connected in parallel relation to the resistor R12 through a switching button B2 which is open in its rest position.

The output of the gate P2, which forms a second output of the flip-flop BA1, is connected through a resistor R18 to a switching transistor T2. The emitter of this transistor forms a second control output for the generator device GM and is grounded through a resistance R19 and a light-emitting diode DE2 likely to emit a light of green colour.

The part II of the synchronizing circuit C2, for making the connection between the transformer-mixing TRM and the generating device GM, comprises a relay contact r1 which is connected between the input E1 of the synchronizing circuit CS and the output S of the latter. In the state of rest, the contact r1 is open and connects the output S to the ground through the agency of a resistor R20. This contact r1 is operated by a relay R which is mounted in the emitter circuit of a transistor T3. A connection consisting of a resistor R21 and of a light-emitting diode DE3 likely to emit a light of green colour is connected in parallel with the relay R. Moreover, a diode D5 is connected across both terminals of the relay. The anode of the diode is grounded. The transistor T3 is controlled by a flip-flop BA2. For that purpose, an output of this flip-flop is connected to the base of the transistor T3 through the medium of a resistor R22. A second output of the flip-flop is connected to a series-connection of a resistor R23 and of a light-emitting diode DE4. This diode DE4 is emitting a red light. The flip-flop BA2 consists, as the flip-flop BA1, of two NOR-gates P3,P4 with two inputs, one input of each gate being connected to the output of the other gate. The free input of each gate forms a control input of the flip-flop.

The control circuit for the flip-flop BA2 comprises a potentiometer P2 which is connected between the input E1 of the synchronizing circuit CS and the ground, a Schmitt trigger circuit BS3 connected with its input to the contact slide of the potentiometer P2 and with its output to two parallel-connected input circuits each one of which is connected to the free input of a gate P3,P4. The input circuit of the gate P3 comprises a differential circuit CD3, whereas the input circuit of the gate P4 comprises a differential circuit CD4 before which is mounted an inverter IV6. The differential circuits CD3 and CD4 have the same constructions as the differential circuit CD1. The differential circuit CD3 therefore comprises a capacitor C10, a resistor R24 and a diode D6. The elements of the differential circuit CD4 are designated by the reference characters C11, R25 and D7, respectively. The Schmitt trigger circuit BS3 comprises two inverters IV7 and IV8. Connected in parallel therewith is a resistor R26. A resistor R27 is connected across the slide contact of the potentiometer P2 and the input of the Schmitt trigger circuit BS3. It is, moreover, seen that a diode D8 is connected between the slide contact and the ground. It is the anode which is connected to the latter.

The parts I and II of the synchronizing circuit CS are inter-connected by a diode D9 for enabling the part II to act upon the part I.

Referring again to FIG. 1, it is seen that the system according to the invention also comprises a loud-speaker HP and a head-receiver or earphone CE which may be connected to the system according to the invention by means of two change-over switches IN6 and IN7. According to the position of the switch IN7, the loud-speaker or the head-receiver may be connected in parallel with the line section B or instead thereof.

The message-transmitting system according to the present invention, which has just been described, operates as follows:

The sending of a message through the telephone network may take place as soon as the switches IN1 to IN5 are in their positions shown on FIG. 1. The beginning of the emission of a message is determined by the synchronizing circuit CS in synchronous relationship with the arrival of a service signal.

Before the arrival of such a signal from the generator GM and prior to the closing of the switch button B1, the flip-flop BA1 of the synchronizing circuit CS is biased so that the output of the gate P1 exhibits a positive potential representative of the logic value 1. The output of the gate P2 is therefore in the 0 state from which follows that the input of the gate P1, which is connected to that output, is also in the 0 state. In view of the location of the capacitor C6, the free input of the gate P1 automatically exhibits the value 0. As to the gate P2, in view of its capacitor C8, its free input is in the 0 condition whereas the other input exhibits the value 1. Under such circumstances, the transistor T1 is conducting or on and the diode DE1 emits a red light indicating that the message-generating device GM is off or inoperative. The transistor T2 is off. As to the flip-flop or multi-vibrator BA2, it is the output of the gate P3 which exhibits the state 1. Both inputs of the gate therefore are in the 0 state owing to the 0 value at the output of the gate P4 and to the location of the capacitor C11. The inputs of the gate P4 are in the states 0 and 1, respectively. Under such circumstances, the diode DE4 is energized. The transistor T3 is off and the relay R is not energized. Its contact r1 is open.

By closing the switch button B1 the flip-flop or multivibrator BA1 is made sensitive to the service signals coming from the input E2 of the synchronizing circuit CS. These signals are causing the free input of the gate P1 to pass from the state 0 to the state 1 and thus cause the flip-flop or multivibrator BA1 to toggle or to change its state. The output of the gate P2 assumes the value 1 thereby making the transistor T2 conducting and providing at the emitter the production of a positive signal which is transmitted to the generating-device GM and puts same on. The generator then starts emitting signals representing the message to be sent out. These message signals are causing the free input of the gate P3 of the flip-flop or multivibrator BA2 to assume the state 1 thereby resulting in the toggling of the multivibrator or flip-flop BA2, the conduction of the transistor T3, the energizing of the relay R and the closing of the contact r1. Once the latter is closed the message signals from the generator GM may reach the input E2 of the mixer TRM which receives the service signals at its other input E1. The mixer produces at its output S a mixture of both kinds of signals. The may be metered by means of the amplifier device AM which operates as a clipper-amplifier and by means of the attenutator AT. The messages from the generator GM may be of any suitable character such for instance as musical or advertising messages. It should be pointed out that, during the transmission of the messages, the gates P2 and P4 of the multivibrators or flip-flops BA1 and BA2 exhibit at their two inputs the potential 0 and at their outputs the value 1.

At the end of the transmission of a message, the free input of the gate P4 returns to the level 1 thereby causing the toggling or change of state of the multivibrator or flip-flop BA2, the blocking of the transistor T3, the de-energizing of the relay R and the opening of the contact r1 hence the breaking of the connection between the mixer TRM and the message generating device GM. Through the medium of the diode D9, the toggling or change of state of the flip-flop or multivibrator BA2 results in the toggling of the flip-flop or multivibrator BA1. The output of the gate P1 becomes positive again and this causes the transistor T1 to be conducting or put on. The positive signal which is generated at the emitter of the latter will switch off the generating device GM.

If it is desired to stop the generator GM before the end of a message it suffices to close the button switch B2 thereby causing the free input of the gate P2 to pass from the state 0 to the state 1. The flip-flop or multivibrator BA1 changes its state. As just stated, this results in the generator GM being stopped or switched off.

Figure 2:
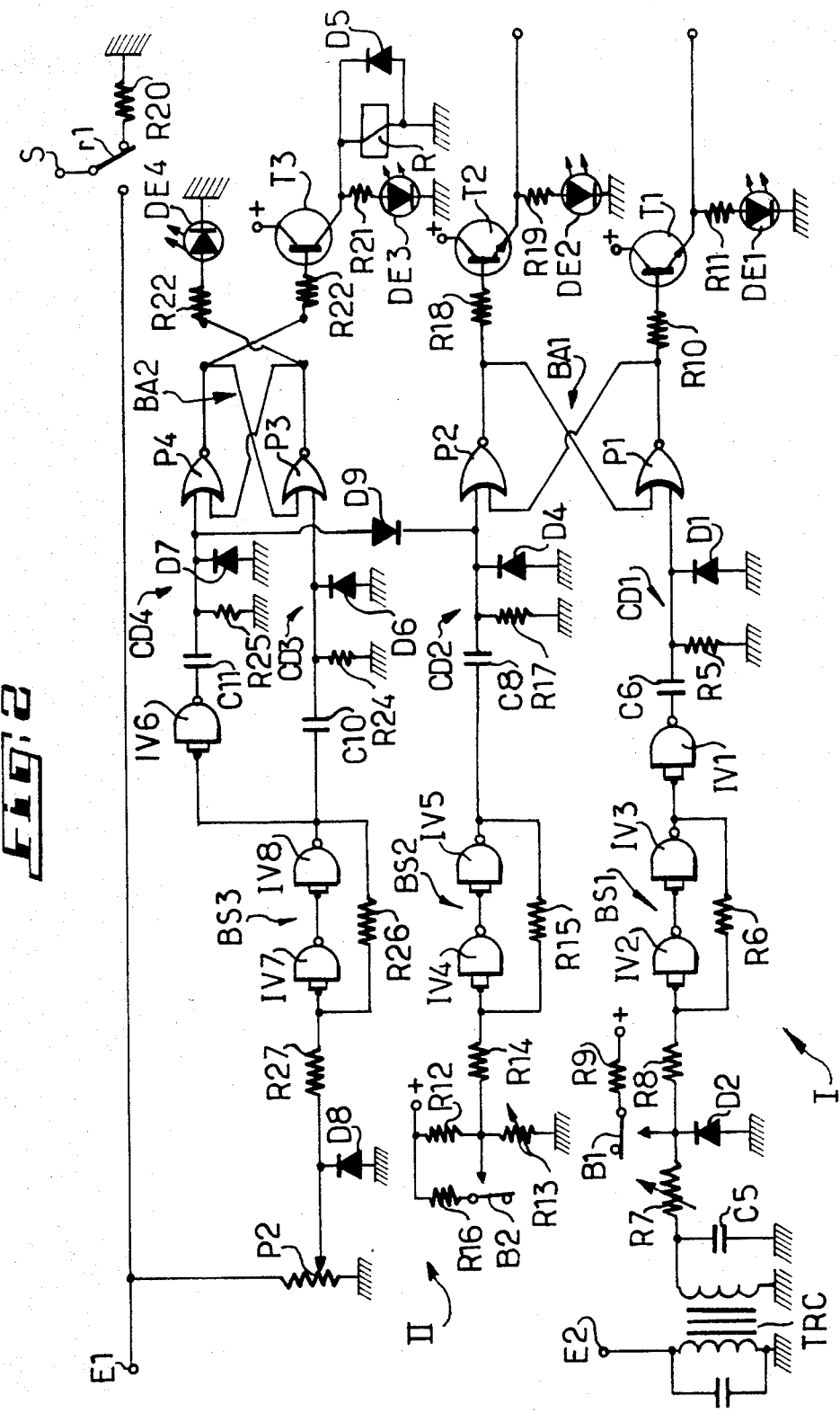
FIG. 2 shows the arrangement of the synchronizer of the block diagram according to FIG. 1.

It is obvious that the system according to FIGS. 1 and 2, such as described and shown, may be modified in various ways within the scope of the present invention. For instance, the mixer could be of any suitable nature. The synchronizing circuit CS could comprise means causing the generator GM to stop or to be switched off at the end of a service signal. The generating device GM could comprise any number of generators, each one of which is likely to be connected to the transformer TRG through the agency of a switch, as shown on FIG. 1.

Figure 3:
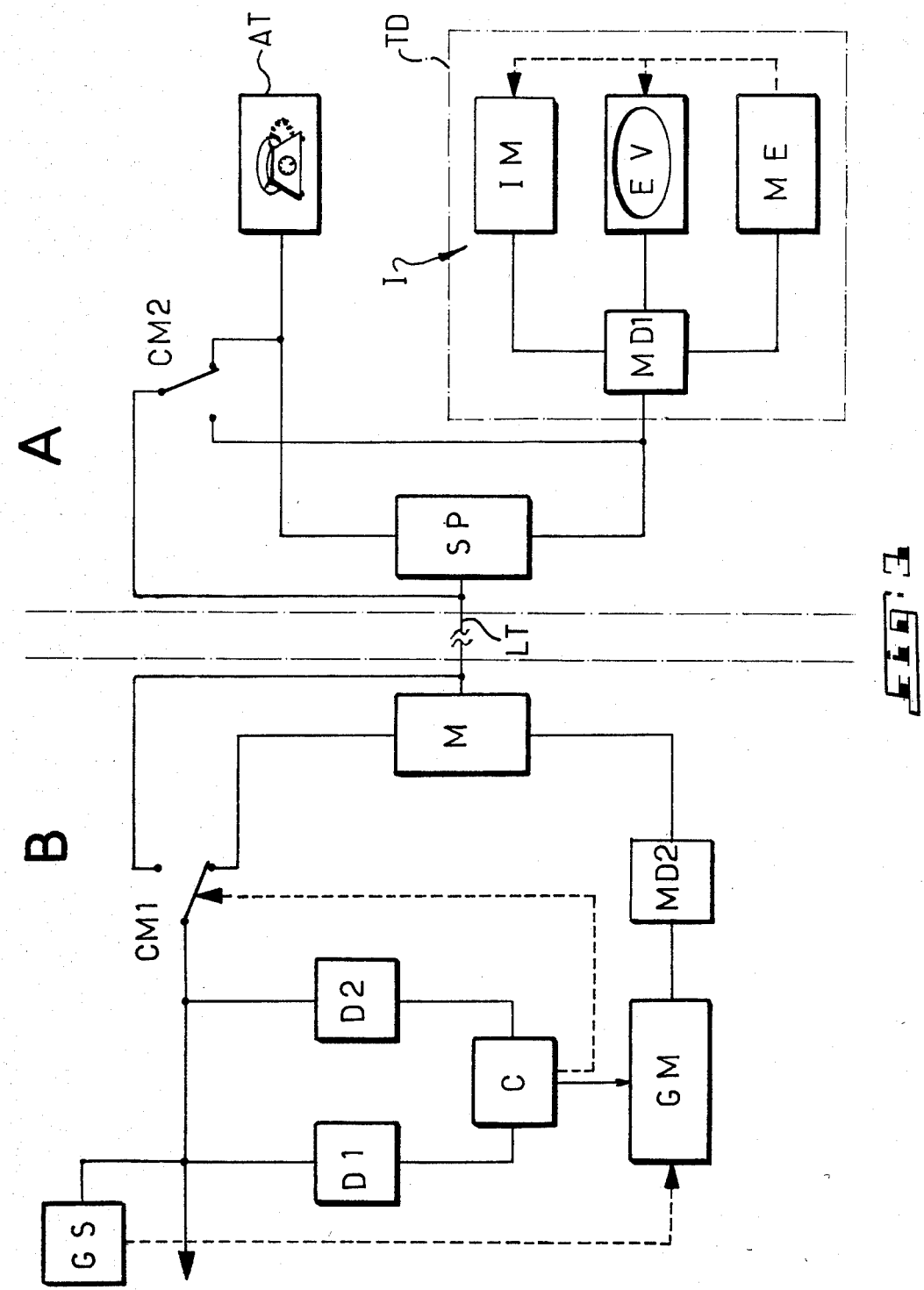
FIG. 3 illustrates another embodiment of the invention for visually displaying messages.

FIG. 3 shows an embodiment of the invention which is adapted to a telematic system.

As seen on FIG. 3, in such a system a subscriber's terminal A is connected through a subscriber's telephone line LT to a central station B. The subscriber's terminal A comprises a telephone set AT and a data processing device TD adapted to reproduce onto a suitable support the information or data which may be transmitted to the terminal A by the subscriber's line LT. According to the Figure, the inputs of the telephone set AT and of the data processing device TD are connected to an output of a signal separator SP, respectively, the input of which is connected to the subscriber's telephone line LT. The functon of this separator is to separate the accoustic signals adapted to be read out or picked up by the receiver of the telephone set AT, from the data for instance digit signals to be processed in the device TD.

In the example shown, this data processing device TD essentially comprises a viewing screen EV such for instance as a cathodic screen, a printing device IM such as a printer and a storage or memory device ME. These various devices are connected to a modulator-demodulator unit (MODEM) MD1 performing the function of a converter as known in the art. The storage device ME is adapted to receive series information and to transmit them in parallel or in series but possibly with a higher speed of transmission. The arrows show the action of the storage device upon the screen devices EV and upon the printing device IM.

As to the central station B, there is provided a mixer M both inputs of which are likely to be connected to a service signal generator GS and to a message generator GM. The output of the mixer is connected to the subscriber's line LT.

According to the present invention, the message generator consists of a device for emitting signals such as data signals likely to be processed in a data processing device such as the device TD of the subscriber's terminal A, i.e. messages adapted to be reproduced onto a support such as the viewing or visualizing display screen EV and/or onto a printing support (printer IM). With possibly the assistance of a MODEM device MD2 the information to be sent to the terminal A may be processed so as to correspond in terms of the speed of transmission and of the frequency band width or range to the data signals normally transmitted by the network.

The message generator GM is operated by a control circuit C under the action, according to the example shown, of two detectors D1,D2 connected to the telephone line between or across the service signal generator GS and the mixer. The detector D1 could perform the function of sensing the presence in the subscriber's line of a service signal for instance of a signal requesting the subscriber using the terminal A after he has unhooked or lifted the handset of its telephone set AT to dial the calling number of the telephone set, station or terminal with which he wishes to communicate. The detector D2 could be sensitive to the end of the stop of making the telephone connection and in particular to the moment at which the called subscriber replies for instance by unhooking or lifting his handset. The signal produced by the detector D1 could cause the control circuit C to put the message generator into operation or on, whereas a signal from the detector D2 could cause the generator GM to be stopped or put off through the medium of the control circuit C. In such a case, the generator GM would emit messages during the whole step of establishing the telephone connection until the moment of a positive reply from the called subscriber's telephone set.

The detectors could, of course, be adapted while being possibly completed with other detectors to accomplish more complex functions and for instance to work in such a way that the generator GM be emitting only during the periods of absence of service signals or only during certain periods of the line connection establishing step. It could also be provided that the service generator GS controls the message generator directly or indirectly, in accordance with the type of service signals it emits as symbolized by the arrowed dashed line.

These various simple or even complex functions for controlling the message generator GM may be carried out in any known suitable manner.

It should be noted that the service signals consist of periods of presence of oscillations with frequencies of several hundreds of Hertz, for instance between 400 and 500 Hz. These signals may therefore be easily detected or sensed.

It is readily understood that, under such circumstances, the separation of the service signals from the data signals may be easily accomplished by the separator SP of the subscriber's terminal A if the MODEM MD2 forming a converter associated with the message-generator GM uses carrier frequencies which are sufficiently spaced from the service frequencies.

To complete the description of the message transmitting system shown, this system comprises a commutating switch CM1 for short-circuiting the mixer M and a commutating switch CM2 adapted to connect the telephone set AT and the data processing device TD alternately and directly to the telephone line LT without the signals being compelled to pass through the separator SP. As symbolized by arrowed lines, the commutating switch CM1 could be actuated by the control device C in synchronizing relationship with the operation of the message generator GM.

The operation of the message transmitting system follows from the description of the structure of this system and of the functions the various elements and devices have to perform.

When a subscriber owner of the terminal A wishes to be put in communication through the telephone or data transmitting network, with another subscriber's set, station or terminal, which may be a data bank or a for instance banking transaction center or any other information-emitting institution, he unhooks or lifts the handset of his telephone set AT. Subsequent to this step, the central station transmits to him several signals requesting him to do the necessary steps for establishing the telephone connection. According to the functions assigned to the detectors D1,D2 which have been set forth hereinabove, the message generator GM will emit messages of a nature suitable for being reproduced in the subscriber's terminal A from which the call for establishing a telephone connection is originating. These signals before reaching the mixer M and before being fed into the subscriber's telephone line LT, where they possibly will be superposed to the service signals, will be processed by the MODEM MD2 to be matched with the properties and capabilities of the network. This processing is, of course, different according as the telephone lines are ordinary or special lines, i.e. consisting for instance of optic fibres or coaxial cables. It is well known that, in this latter case, the output of binary digits or bits, i.e. the rate of transmission or the speed of modulation may be much higher and even make possible the transmission of television signals. The MODEMs MD1 and MD2 should, therefore, be designed in accordance with the admissible rate or speed of modulation of the network.

The system according to the present invention makes possible the data transmission from the message generator GM during the whole period of establishing the telephone connection.

In the subscriber's terminal A the data signals, after having been carried through the separator SP, may be viewed or visually displayed directly and immediately on the screen EV or printed by the printing device IM. If the network allows a sufficient rate of transmission, the calling subscriber could see for instance a television picture or a text appearing on his screen. If the telephone line does not allow a rate of transmission high enough, i.e. a binary digit or bit output adequate for a direct display as a picture on the screen, the information could be stored in the storage or memory ME and transmitted later for instance at a given time with an adequate output to the screen or to the printer.

It will be understood that the message transmitting system according to the present invention makes possible a large number of applications without departing from the principle which has just been stated. In the system according to FIG. 3, could of course be used a synchronizer circuit of the kind described with reference to the embodiment shown in FIGS. 1 and 2.

Conversely, a control circuit for a detection device such as shown and described in relation to the system shown in FIG. 3, is usable in the embodiment according to FIG. 1 in replacement of the synchronizer. There could thus be provided for the first embodiment, an emission of messages during the period of silence between two successive service signals. As a general rule, the means used in one embodiment may be incorporated into the other embodiment at least in a suitable, practical and possibly equivalent version.

Figure 4:
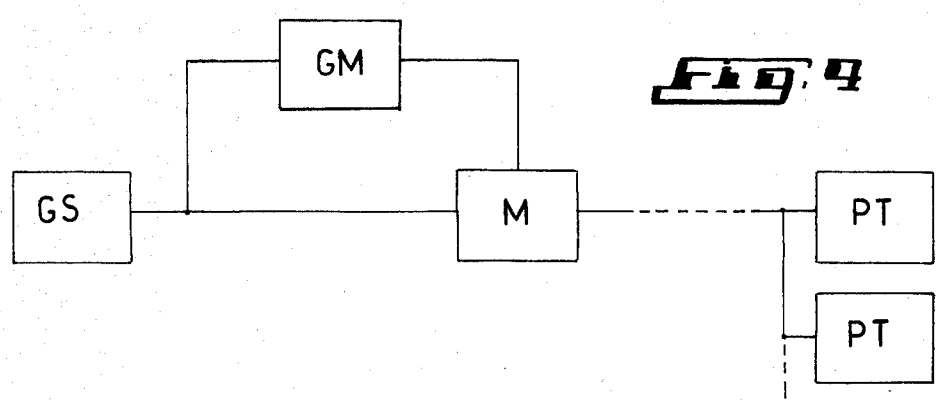
FIG. 4 is a block diagram illustrating more schematically than FIG. 1 the principle of a system for the transmission of messages according to the present invention.

FIG. 4 shows the system of the present invention comprising device GS for generating special currents intended for the supply of a certain number of service signals, such as dialling signals, calling signals, routing signals, busy signals, re-call signals, etc., and message generating set GM, which are connected to the two inputs of mixer device M whose output is connected to a certain number of telephone sets or stations PT through a telephone system or network (not shown). According to the invention, the message generating set GM comprises a "master" portion illustrated in FIG. 6 and a "slave" portion illustrated in FIG. 5. It is possible to use one "master" portion and a certain number of "slave" machines. The latter constitute sub-units intended to be installed in telephone exchanges. They serve the function of transmitting the messages to the mixing device M, consisting, as shown in FIG. 1, of a transformer with two primary windings connected in series and one secondary output winding. The master portion is adapted to furnish the order in which the messages must be transmitted.

Figure 5:
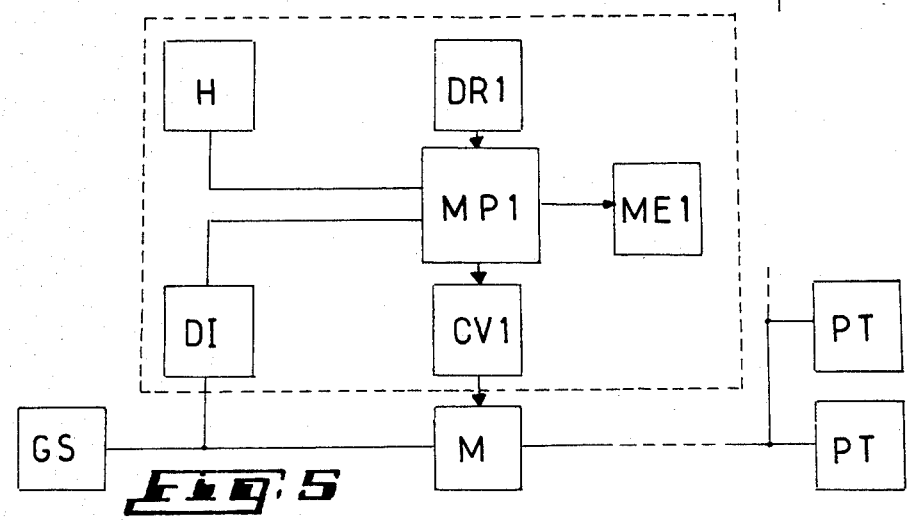
FIGS. 5 and 6 are block diagrams of the "slave" and "master" portions, respectively, of the system according to the invention.

According to FIG. 5, the slave portion comprises a control unit such as a computer or microprocessor MP1 with which are associated in the manner illustrated a storage device ME1, an interface device DI inserted between the microprocessor MP1 and the telephone line, a clock device H, a recording-medium support device DR1 and a digital-to-analog converter CV1.

Figure 6:
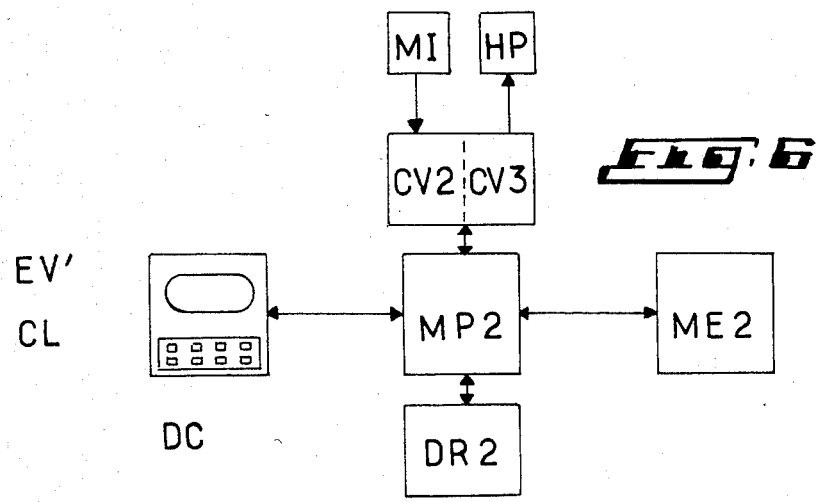

Referring to FIG. 6, it is seen that the master portion comprises a control unit such as a computer or microprocessor MP2 with which are associated a control device DC comprising an alphanumeric keyboard CL and a display screen EV', a storage device ME2, a converter device provided with an analog-to-digital converter CV2 and a digital-to-analog converter CV3, which are connected to a microphone MI and to a loudspeaker HP, respectively, as well as a recording-medium support device DR2.

It should be noted that these two portions may be either separated, as shown in the Figures, or combined with one another. In the latter case, use may be made of a single microprocessor, a single storage device and a single recording-medium support device.

It should be pointed out that the recording mediums consist of magnetic discs on which the information is recorded in digital form. Indeed, in order to favor easily modifiable and flexible transmission strategies, it is necesssary to be able to accede as quickly as possible to any available message. This requirement is met within the scope of the present invention, by recording on discs rather than on magnetic tapes.

The digital recording of the sound signals is effected by sampling at the frequency of 4 kHz. This frequency provides a good compromise between the fidelity of sound transmission and the use of the storage device of the microprocessor, since the pass-band of the telephone line is 3 kHz. Thus, the analog-to-digital converters receive the audiofrequency signal and sample it at the frequency of 4 kHz, by furnishing to the microprocessor a sequence of 8-bit value. The digital-to-analog converters receive from the microprocessor a sequence of 8-bit value and use the same to restore the audio-frequency signal and supply it in pre-amplified form at their outputs.

The screen EV' and the alphanumeric keyboard CL are used by the operator to send commands and obtain information from the microprocessor. In the system just described, the necessity for the presence of the operator is reduced to the replacement of the disc containing the messages and the transmission sequence, when one of these elements is to be changed, typically once a day. The system is designed to be insensitive to the phase shifts of the members in movement and to the variations on the frequencies of the exchanges. It is designed to be automatically adaptable to various telephone switchboards.

As regards the clock device, it should be noted that it comprises a quartz clock and furnishes to the microprocessor and instant hour and date information. It is equipped with a booster battery in order to continue functioning and keeping the time even when the microprocessor is inoperative.

Regarding the operation of the two portions constituting the message generating set, it should be noted that the master sub-set serves essentially the function of preparing the data which are used by the slave sub-sets. The master portion is adapted to allow recording new messages, hearing them and programming the transmission times, as will be shown later.

As regards the mode of operation of the slave device, it is to be noted that the program of the message generator has a timetable consisting of a sequence of elements of the time: initial time—final time—name of message. By using this timetable and the instant time furnished by the clock H, the program recognizes the interval into which instant time falls and transmits the associated message. When the instant time reaches the final time, the program reads a new element of the time-table, withdraws from the disc the relative message, loads it into the storage device and begins transmitting it until the new final time is reached. It should be observed that the transmisssion of the message requires that the latter be present in the storage device, for it is not possible to effect a direct transmission from the disc to the converter, since the latter requires the transmission of 4,000 values per second. This frequency exceeds the possibilities of the disc which needs 15 seconds to transfer a complete message into the storage device. For example, there can be stored on the disc eight different messages of 3 seconds, completed by the relative time information. Of course, by using other discs, it is possible to store a much greater number of messages.

The operation of the master portion and the structure of the program of the message generating set will be described by means of the following examples.

After starting the computer, i.e., in the case considered, the microprocessor, and after lighting the screen EV', a master diskette is inserted into the device DR2. After appropriately actuating definite keys of the alphanumeric keyboard CL, there appear on the screen the word "master" and the message "introduce slave-diskette". The master-diskette is then removed and a slave-diskette is introduced. After actuating an appropriate key, the program presents the lists of presently available messages and requires a command. It is possible to furnish four commands which allow listening, recording, programming the time schedule and ending the program.

To allow hearing a message, the program causes the words "message number?" to appear on the screen. This is answered by introducing by means of the alphanumeric keyboard the number of the desired message. This number corresponds to one of the messages, the heading of which is written on the upper portion of the screen. After a few seconds, the program reproduces the requested message and returns to the initial position.

In order to record a message, the appropriate key provided on the keyboard CL is actuated and the number of the message which it is desired to replace is tapped out after being invited by the program to do so. The program causes the word "recording" to blink for the whole duration of the recording (three seconds). When the recording is completed, the program again causes the message to be heard and then asks whether everything is in order. If the recording is not satisfactory, an appropriate key is actuated and the program is returned to the starting point. If it is desired to again hear the message just recorded, the keyboard is actuated and the program returns to the point allowing a new hearing of the message. If the recording is now satisfactory, the program is adapted to request comments after appropriately actuating the keyboard. A short commenting phrase can then be formed which identifies the recorded message. The program stores on the disc the new message, at the same time erasing the former one which had the same number, and then returns to the starting point.

In order to program the transmission time, the keyboard is again actuated, thus allowing the message transmission sequence to be programmed. The program presents the initial time reached (starting from 00.00) and asks "until". This is replied by introducing a final time in the form "hour, minutes". The program is adapted to thereafter ask the number of the message. The number of the message which it is desired to transmit in the defined time interval is introduced. The program presents the new initial time and returns to the starting position of the transmission time-schedule programming until the final time introduced is 24.00. When the final time reaches this position, the program asks whether everything is in order. If no error has been made, this is replied by appropriately actuating the alphanumeric keyboard. The program then stores on the disc the timetable thus defined.

In order to end the program, the keyboard is actuated and the program causes the words "disc formed" to appear on the screen and then stops. The operation of the system can now be restarted either in slave mode or again in master mode.

To operate the slave portion, a slave diskette is introduced into the device DR1 and the alphanumeric keyboard is actuated. The program, by following the programming stored on the disc and by displaying on the screen the instant time, automatically begins to transmit the message presently being transmitted and the final time of the message in question.

The system according to the present invention allows communicating small messages of any kind, e.g. advertising messages or any other information appropriate or useful to the person who has removed the receiver of his telephone set to call another set and who is awaiting the reply of the subscriber called. The messages are inserted into the pauses of the bell, detectable by detecting means provided for example in the interface device DI.

What is claimed is:

1. In a telephone system, comprising a plurality of subscriber stations each provided with a subscriber terminal including a telephone set, a telephone transmission network, each of said subscriber stations being interconnectible to another of said subscriber stations via said transmission network, service signal generating means for generating and emitting service signals relating to the establishing of a telephone connection between two subscriber stations, and telephone line means connecting the output of said service signal generating means to said subscriber stations for transmitting said service signals to a subscriber station emitting a call for the establishment of a telephone connection with another subscriber station, a message transmitting system for transmitting messages to a subscriber station calling for the establishment of a telephone connection during the period of establishing said connection, said message transmitting system comprising message generator means for generating and emitting said messages, service signal transmitting circuit means, message transmitting circuit means, and a mixer having a first input connectible to said service signal generating means through said service signal transmitting circuit means and a second input connectible to said message generator means through said message transmitting circuit means, said mixer having an output connected to said telephone line means and said mixer, first and second inputs being simultaneously connectible to said service signal generating means and said message generator means.

2. A system as claimed in claim 1, further comprising a synchronizing circuit for insuring synchronized emissions of service signals and of messages by said service signal generating means and said message generator means.

3. A system as claimed in claim 1, wherein said mixer consists of a transformer with two primary windings and a secondary winding and wherein said primary windings have free terminals acting as inputs of said mixer and a common terminal connected to a point at ground potential.

4. A system as claimed in claim 1, further comprising switch means for connecting said message transmitting system to said telephone line means.

5. A system as claimed in claim 1, wherein said service signal transmitting circuit means connected to said first input of said mixer comprises an amplifier and said message transmitting circuit means connected to said second input of said mixer comprises an attenuator.

6. A system as claimed in claim 1, wherein said message generator means comprises data reproducing means and signal emitting means for emitting signals such as data signals for reproduction at the terminal of a subscriber station calling for the establishment of a telephone line connection to said data reproducing means, said message generator means being connected to the second input of said mixer, the first input of which receives the service signals from said service signal generating means, and the output of said mixer being connectible to the calling subscriber's station.

7. A system as claimed in claim 1, wherein said message generator means includes a master portion having a control unit and recording unit and at least one slave portion having a unit for execution and transmission of the messages to the telephone line.

8. A system as claimed in claim 2, wherein said synchronizing circuit comprises a first circuit arrangement for the on/off control of said message generator means, said first circuit arrangement being connected to said service signal transmitting circuit means and being responsive to said service signals for detecting the presence or absence of a service signal.

9. A system as claimed in claim 6, further comprising separator means for separating the service signals from the signals to be reproduced by said data reproducing means at the subscriber's telephone terminal, said separator means having an input coupled to the output of said mixer and two outputs coupled to said data reproducing means and the telephone set at said terminal, respectively.

10. A system as claimed in claim 6, further comprising a control circuit, a first detector sensing the presence of service signals and a second detector responsive to the response of the called subscriber's terminal after the establishment of a telephone connection between a calling and a called subscriber station, said detectors being connected to said control circuit for selectively switching said message generator means on and off.

11. A system as claimed in claim 6, further comprising memory means at the subscriber's telephone set for storing information received from said message generator means during the period of making a connection with the called subscriber's telephone set and for reproducing said information at any desired suitable time via said data reproducing means.

12. A system as claimed in claim 6, further comprising a modulator-demodulator connected between said message generator means and said mixer.

13. A system as claimed in claim 7, wherein said message generator means comprises computer or microprocessor means, program memory means and means for recording and reproducing the messages in accordance with the program stored in said program memory means.

14. A system as claimed in claim 7, wherein said message generator means further includes a clock for permitting the programming in time of the messages to be transmitted.

15. A system as claimed in claim 8, wherein said synchronizing circuit further comprises a second circuit arrangement for controlling the making and breaking of a connection between said mixer and said message generator means in accordance with the presence, absence and/or end of a message from said message generator means at an input of said synchronizing circuit.

16. A system as claimed in claim 10, further comprising a commutating switch for switching said mixer on and off, said commutating switch being operated by said message generator means control circuit in synchronized relationship with the control of said message generator means.

17. A system as claimed in claim 13, wherein said recording and reproducing means comprises a recording medium for storing a plurality of messages recorded in digital form.

18. A system as claimed in claim 13, wherein said computer or microprocessor means is programmable by a program and the messages to be transmitted are designed, reproduced and modified in accordance with the program.

19. A system as claimed in claim 15, wherein said synchronizing circuit further comprises means for interconnecting said first and second circuit arrangements and adapted to cause the generation of a control signal for switching off said message generator means by said first circuit arrangement upon the detection of the end of a message by said second circuit arrangement.

20. A system as claimed in claim 15, wherein said synchronizing circuit further comprises a message receiving input connectible to said message generator means and an output connectible to said second mixer input, a commutating switch connected between said message receiving input and said output and a control circuit for said commutating switch which is responsive to the presence of a message at said message receiving input.

21. A system as claimed in claim 15 wherein said first circuit arrangement further comprises a detector circuit and a bistable multivibrator having two inputs and two outputs, one input being connected to said detector circuit for sensing a service signal for causing the generation of a signal for energizing said message generator means and the other input functioning as the control input for deenergizing said generator means.

22. A system as claimed in claim 17, wherein said recording and reproducing means further comprises analog-to-digital converter means having sampling means for recording messages in digital form.

23. A system as claimed in claim 19, wherein said first circuit arrangement of said synchronizing circuit further comprises control means for stopping said message generator means before the end of a message.

24. A system as claimed in claim 21, wherein said second circuit arrangement of said synchronizing circuit comprises a bistable multivibrator having one input which is sensitive to the presence of a message at the message receiving input of said synchronizing circuit and another input sensitive to the end of a message.

25. A system as claimed in claim 21, wherein said bistable multivibrator comprises two NOR gates each having an output and an input, the output of one gate being connected to the input of the other gate.

26. A system as claimed in claim 22, wherein said converter means effects the sampling at a frequency of the order of 4 kHz.

27. A system as claimed in claim 22, wherein said sampling means samples at a frequency of the order of 4 kHz to effect the recording of the messages in digital form, and further comprising intermediate memory means for transmitting from said recording medium to said mixer.

28. A system as claimed in claim 24, wherein said second circuit arrangement further comprises a control circuit for a relay, and one input of said bistable multivibrator is connected to said control circuit for said relay and said commutating switch is a contact operated by said relay.

29. A system as claimed in claim 24, wherein said bistable multivibrator comprises two NOR gates each having an output and an input, the output of one gate being connected to the input of the other gate.

30. A system as claimed in claim 26, further comprising intermediate memory means between said recording medium and said digital-to-analog converter means for transmitting the messages to said mixing device.

* * * * *